June 29, 1965
W. R. McBRIDE
3,191,746
TRANSFER APPARATUS
Filed March 14, 1962
5 Sheets-Sheet 1
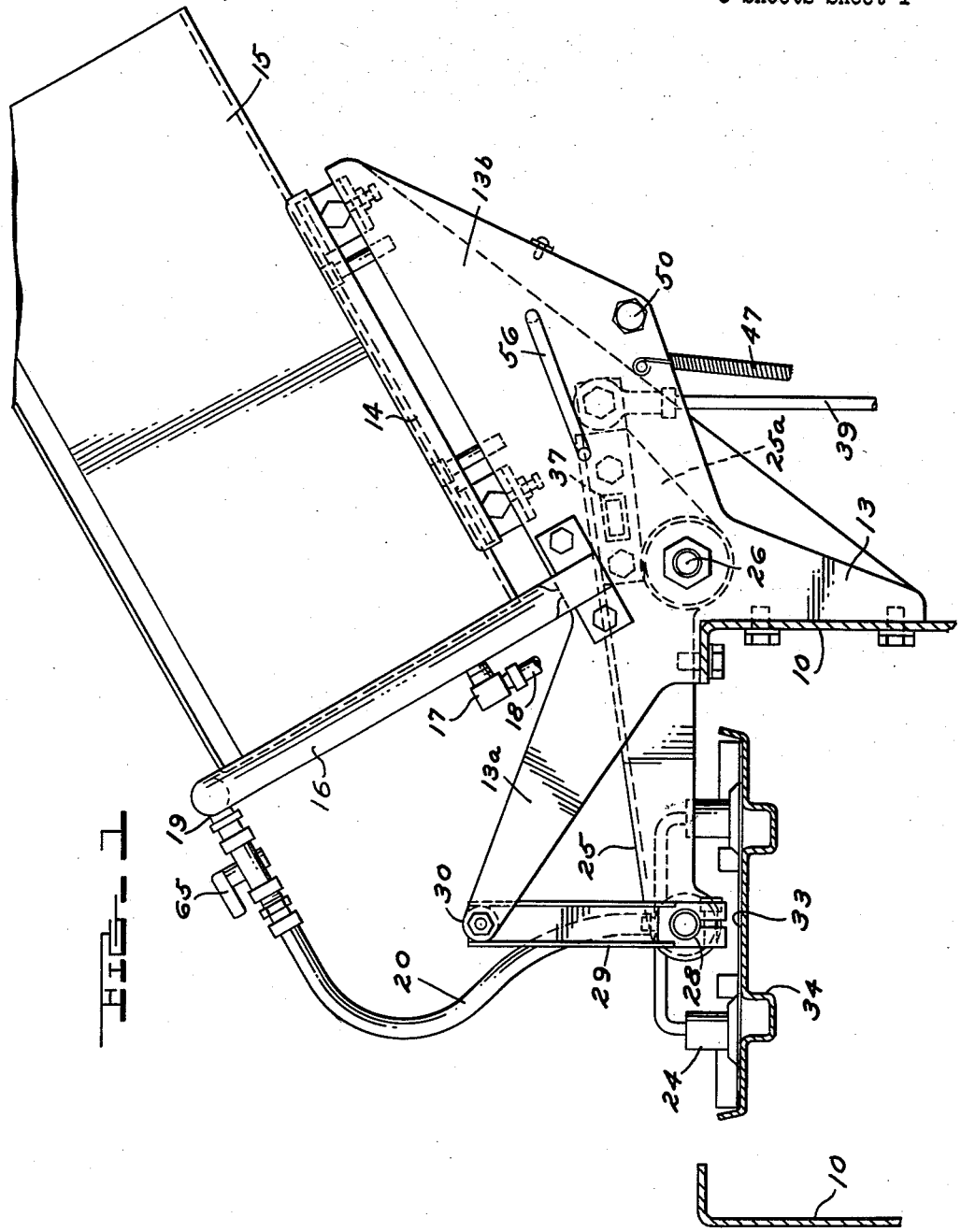
INVENTOR.
WILLIAM R. McBRIDE
BY
ATTORNEYS

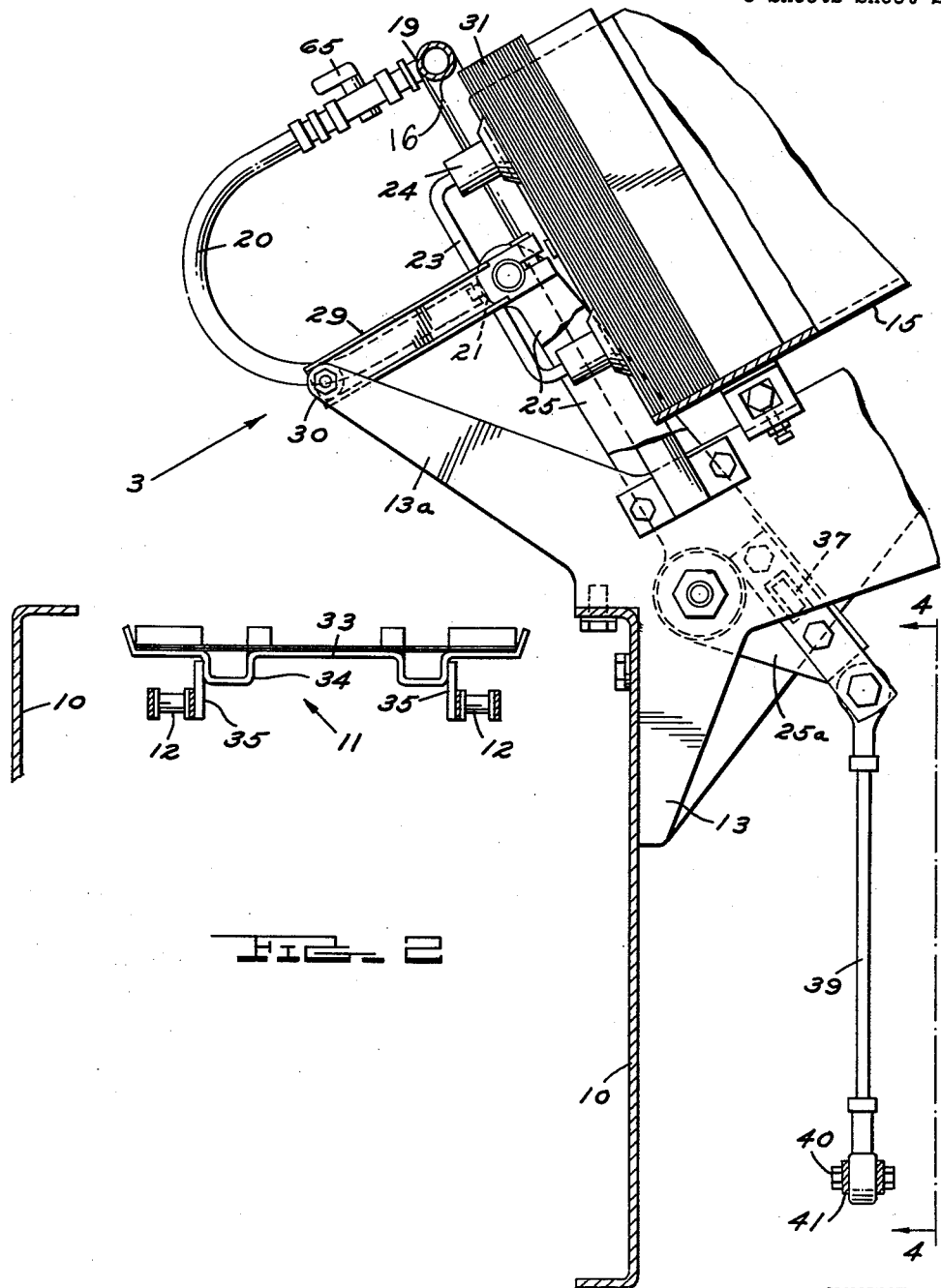

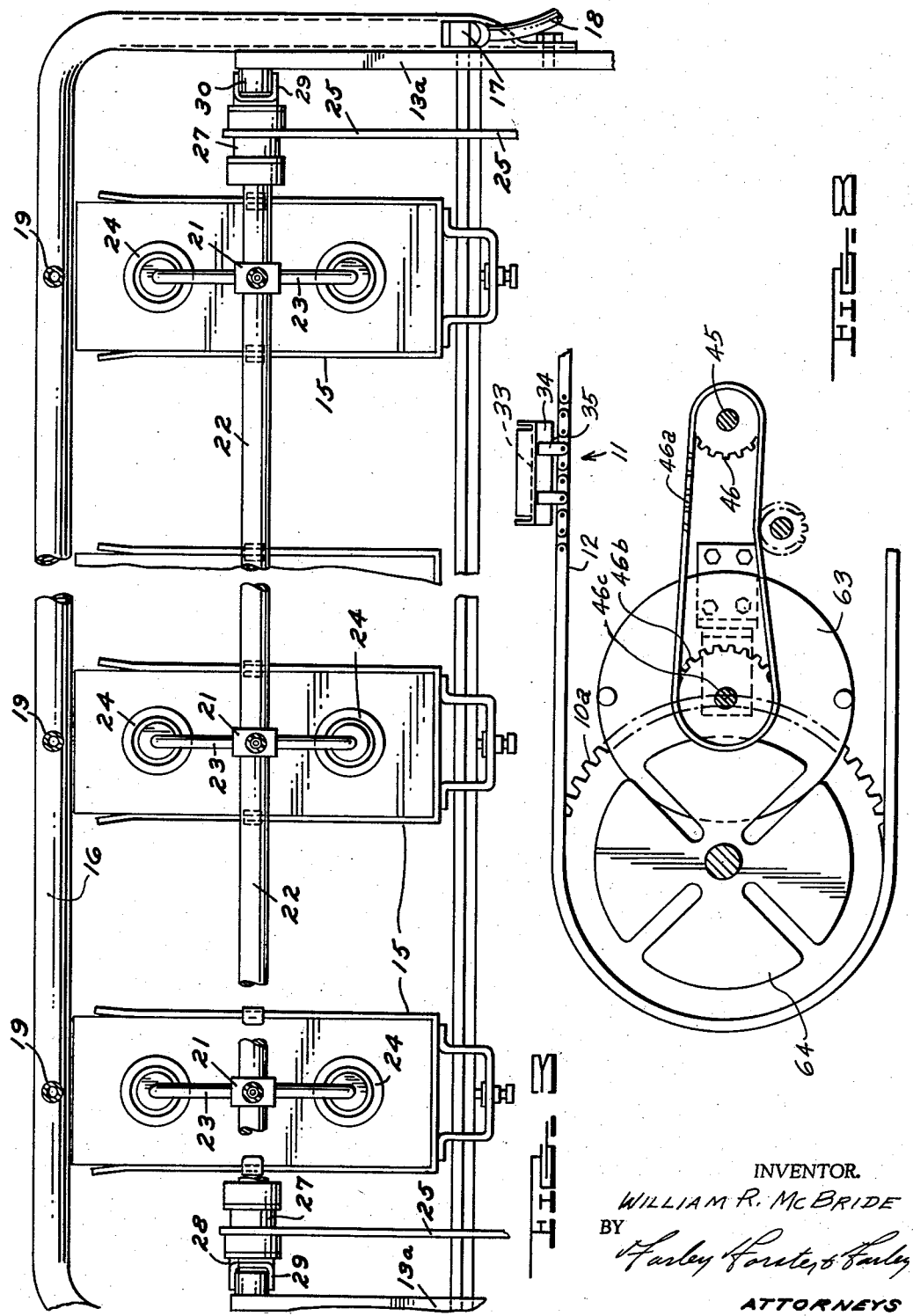

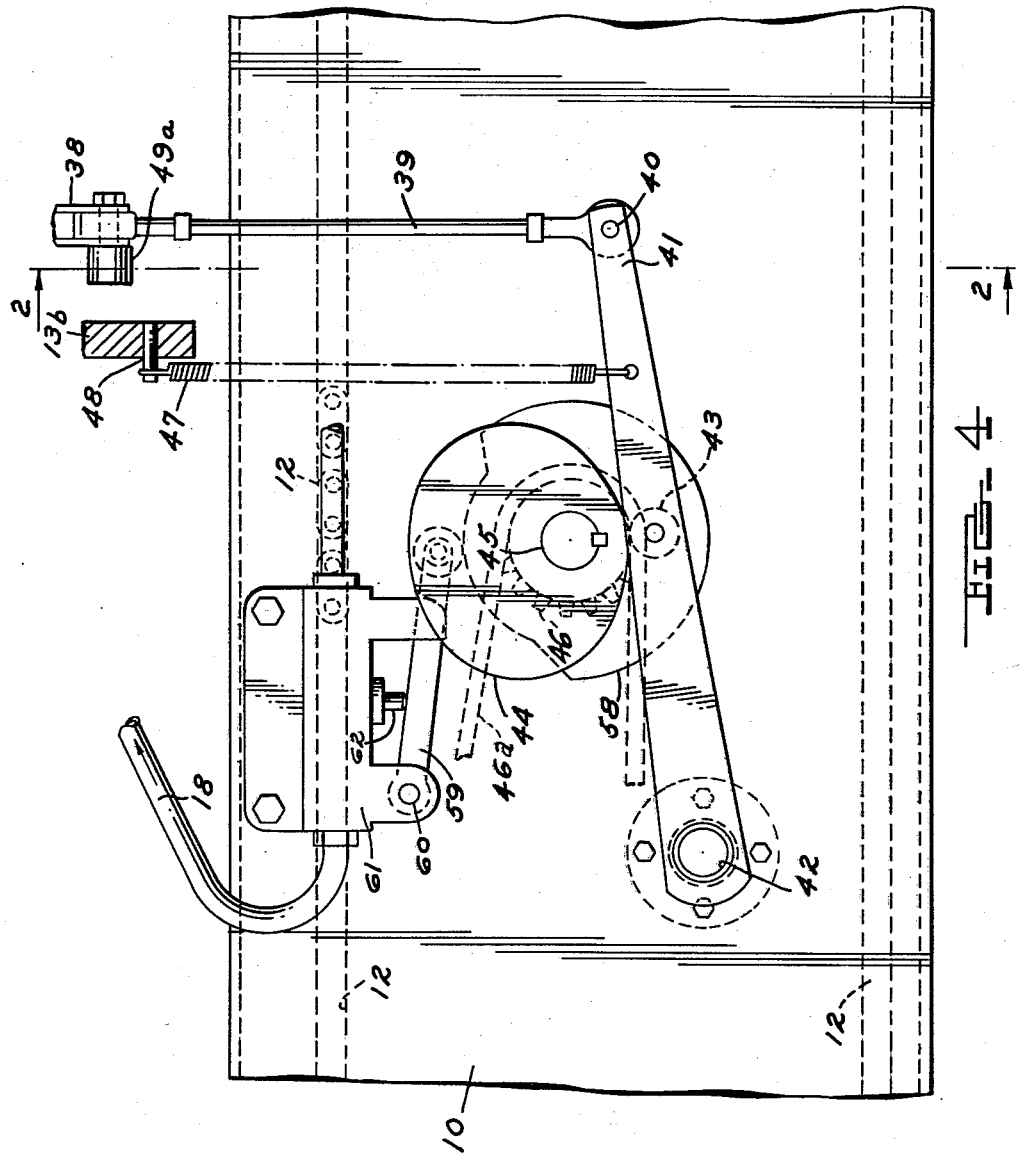

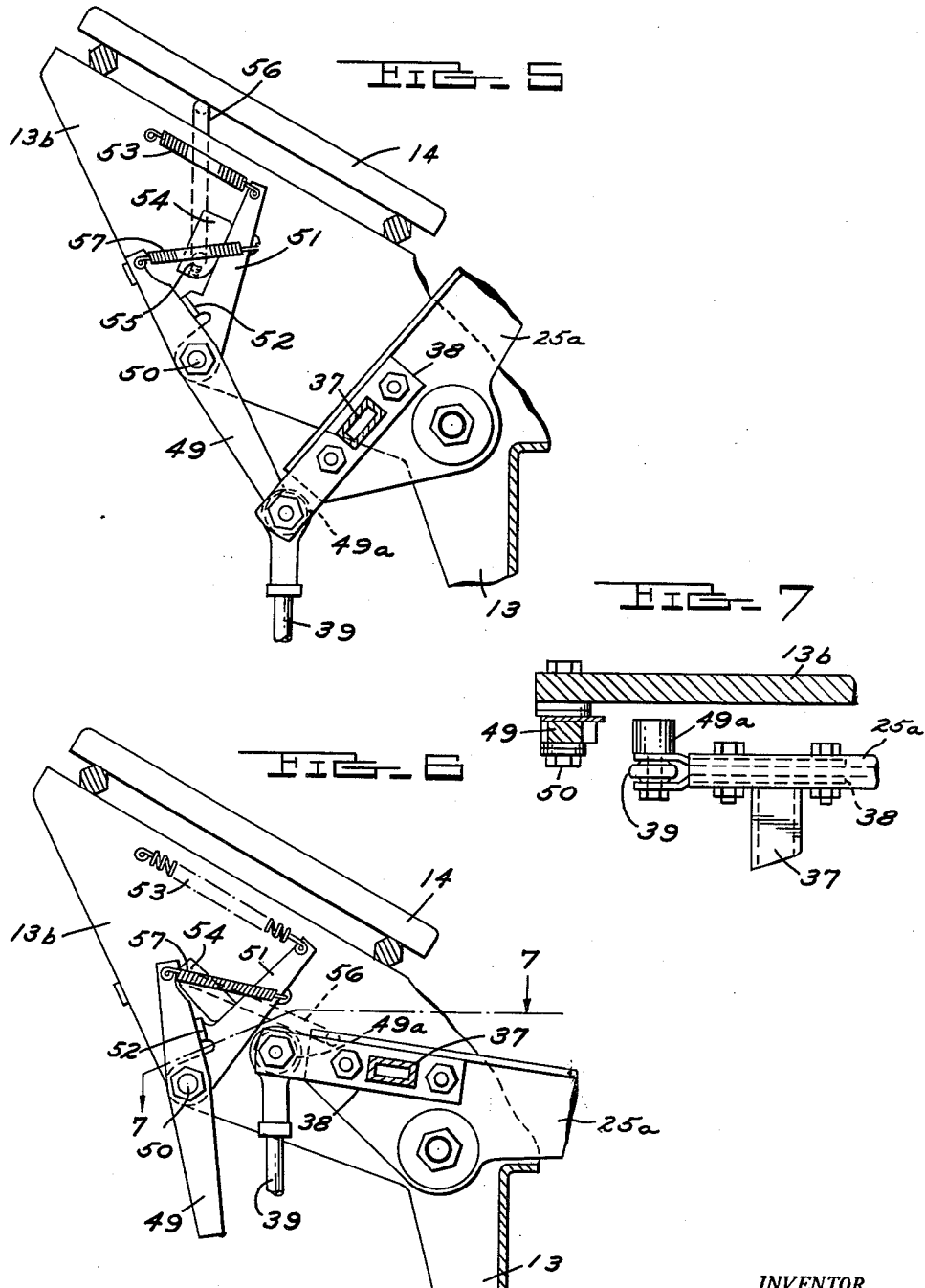

United States Patent Office 3,191,746
Patented June 29, 1965

3,191,746
TRANSFER APPARATUS
William R. McBride, Rochester, Mich., assignor to Design Products Corporation, Troy, Mich., a corporation of Michigan
Filed Mar. 14, 1962, Ser. No. 179,728
12 Claims. (Cl. 198—20)

This invention relates to an improved apparatus for transferring currency or similar paper items from a series of supply chutes in which, for example, each has a particular monetary denomination to a passing series of stacks each ultimately having a desired mix of denominations.

A specific application for such apparatus is its use in banks for mechanically combining any desired mix of twenties, tens, fives and/or one dollar bills in packets having desired totals for convenience in cashing checks.

The present mechanism makes use of a general transfer system which has been in prior commercial use consisting of a horizontal conveyor having a series of spaced currency receivers moved progressively past a series of similarly spaced currency supply units from which a series of bills are individually removed by vacuum cup devices on a common transfer arm actuated by linkage synchronized with the conveyor drive to transfer the series of bills into the respective receivers on the conveyor each time the conveyor moves a unit space. The supply units commonly employ a downwardly inclined chute with a terminal outlet having retaining lips spaced slightly less than the bill width adapted to receive a stack of bills, an appropriate weight sliding in the chute against the stack to hold it against the terminal outlet, and the vacuum cup apparatus operating to remove one bill at a time while the retaining lips hold the remainder of the stack. The vacuum transfer arm apparatus is usually adapted through valving synchronized with conveyor travel to drop the bills into the receivers or in some cases air pressure is introduced to blow the bills into the receivers when the vacuum cups have reached discharged position.

The present invention is directed to improve this general type of apparatus in several respects: the path of the transfer arm and more particularly of the vacuum cups for engaging the bills is a somewhat irregular path difficult to establish by normal mechanical components inasmuch as its approach to the stacks of supply bills should be normal to the discharge face of the stack followed by movement normally back away from the stack and through an arc somewhat exceeding 90° and then down normal to the horizontal receivers on the conveyor. Prior drives and linkages for deriving such motion in synchronization with the conveyor travel have been deficient in requiring large forces and power and in being incapable of operation at desired high speeds. The present improvement provides a simplified linkage having appropriate mechanical advantage throughout all portions of its travel so that lighter forces are required and much higher speeds of operation are obtainable.

Another feature of the present drive linkage is the provision of a drive interrupter which may be employed when it is desired to terminate the transfer feed while the conveyor is running off the last stacks of mixed currency together with an automatic re-synchronization feature whenever the transfer drive is again started. These and other objects of the invention will be more readily apparent from an examination of the drawings illustrating a preferred embodiment wherein:

FIG. 1 is an end elevation of the transfer arm drive mechanism with the vacuum cups in discharge position;

FIG. 2 is a similar view with the vacuum cups in pickup position;

FIG. 3 is a view taken along the line 3 of FIG. 2 showing the transfer arm and a series of vacuum cups in a pickup position against stacks of supply bills;

FIG. 4 is a fragmentary side elevation taken along the line 4—4 of FIG. 2 showing a portion of the synchronized drive between the conveyor and the transfer arm mechanism;

FIG. 5 is a fragmentary view of the latch mechanism employed to interrupt the drive of the transfer arm;

FIG. 6 is a view similar to FIG. 5 showing the latch mechanism in release position;

FIG. 7 is a sectional view taken along the line 7—7 of FIG. 6; and

FIG. 8 is a schematic view of the drive for conveyor and transfer apparatus.

Referring to FIGS. 1 and 2 the framework of the apparatus includes a pair of channel base members 10 supporting a pair of drive sprockets 10a shown in FIG. 8 for driving conveyor 11 through a pair of roller chains 12. On one of the channel members 10 a pair of longitudinally spaced mounting brackets 13 are suitably attached each having a transfer guide arm extension 13a and a supply chute extension 13b on which a longitudinally extending support 14 for a series of currency chutes 15 is suitably mounted. Also mounted on brackets 13 is a stationary air manifold line 16 having a single connection 17 to a supply line 18 and a series of outlets 19 as shown in FIG. 3 each leading to a flexible hose line 20 connected to a rigid fitting 21 clamped onto a common transfer arm 22, a pair of rigid branch lines 23 extending from each fitting 21 to a pair of vacuum cups 24.

A pair of actuating arms 25 pivotally mounted at 26 to the respective support brackets 13 are each connected at one end through a suitable bearing 27 to one end of the transfer arm 22. Outboard of each actuating arm 25 an extending portion of the transfer arm 22 has rigidly attached thereto by a clamp 28 a channel guide track 29 extending normally away from the engagement face of the vacuum cups at all times and adapted to engage a guide roller 30 mounted at the end 13a of the support bracket 13. The effective length of the actuating arm 25 between the pivots 26 and transfer arm 22 is shorter than the spacing between the pivot 26 and the guide roller 30 so that as the actuating arm 25 as seen in FIG. 1 is raised, the guide 29 moves upwardly and then progressively as the actuating arm approaches, reaches and passes alignment with the bracket extension 13a rotates the vacuum cups to their pickup position as shown in FIG. 2. With reference to FIG. 2 it will also be understood that as the actuating arm 25 descends the guide 29 and engagement face of the vacuum cups 24 will initially move normally away from the stack of bills 31 and progressively swing back down terminating in a normal approach of the vacuum cups 24 to the currency stack 33 on the individual tray 34 connected by links 35 to conveyor chains 12. Thus a simple pivotal movement of the actuating arms 25 about the fixed pivots 26 moving the transfer arm 22 in a simple circular arc is caused through the operation of the guide 29 and reaction roller 30 to re-orient the engagement faces of the vacuum cups between pickup and discharge positions as well as to produce desired substantially normal approach and departure paths relative to such positions.

Extensions 25a of the actuating arms are coupled together by a rigid box member 37 welded between straps 38 bolted thereto one of which straps is provided with an extension for coupling to an actuating rod 39 which in turn is connected, as best shown in FIG. 4, at its lower end 40 to a cam arm 41 pivoted at 42 to the frame and actuated through a cam roller 43 engaging a cam 44 driven by shaft 45 through a sprocket 46, chain 46a, sprocket 46b (FIG. 8) and main drive shaft 46c. The cam arm 41 is normally urged into engagement with the cam 44 by tension spring 47 connected to a suitable fixed anchor 48.

Referring to FIGS. 5, 6 and 7 the rod 39 may be held in its lowermost position by a latch 49 pivoted at 50 to another portion of bracket 13 in which position rotation of the cam 44 will be ineffective to actuate the transfer arm. The latch 49 is urged to this inactivating position by a lever 51 also pivoted at 50 having a projection 52 adapted to engage the upper end of the latch 49, the lever 51 being urged by tension spring 53 to the position shown in FIG. 5 when stop 54 pivoted at 55 is moved to the position shown in FIG. 5 by hand lever 56. Upon rotation of the hand lever 56 to the position shown in FIG. 6 stop 54 rotates lever 51 against tension spring 53 to a corresponding position and when upward pressure of the rod 39 resulting from the tension of spring 47 is relieved by engagement of the high point of the cam 44 with the cam roller 43, tension spring 57 will move the latch 49 to the release position shown in FIG. 6. The hand lever 56 may be returned at any time during the cycle to the latch engaging position shown in FIG. 5 the latch 49 with pin extension 49a at the upper end of actuating rod 39 moving as a pawl into engaging position when the rod 39 is urged to its lowermost position by the high point on the cam 44.

With reference to FIG. 4 a second cam 58 driven by shaft 45 actuates a cam follower arm 59 pivoted at 60 to valve body 61 urging a spring-loaded valve plunger 62 to an upward position throughout the effective engagement of the high cam lobe releasing the same to the lower position shown during engagement of the cam follower with the low portion of the cam lobe. The relationship of the two cams 44 and 58 and the setting of the air valve are such that vacuum is established in the supply line 18 by the high portion of cam 58 and released by the low portion.

With reference to FIG. 8 the two cams are driven continuously by motor drive through the main drive shaft 46c while a double pin Geneva drive wheel 63, also continuously driven by the main drive shaft 46c, operates through the Geneva cam wheel 64 to advance the conveyor sprocket 10a one-quarter turn and the conveyor trays 33 one unit space with each one-half turn of the main drive shaft 46c. Through a 2 to 1 overdrive of the sprocket 46 the cams 44 and 58 and transfer apparatus are driven through a complete cycle for each one-half turn of the main drive shaft 46c. The spacing of the Geneva wheel 63 and cam wheel 64 is such as to provide a harmonic acceleration of the conveyor with a lost motion dwell period sufficient to accommodate the depositing and withdrawal movement of the transfer arms with the conveyor in a stationary condition.

In operation petcocks 65 control the shut-off or activation of individual vacuum units as might be desired, for example, in changing the mix of denominations from one total value to another without modifying the bills in the supply chutes. Also at the beginning of a run starting with empty trays the petcocks associated with desired supply chutes are successively opened as the first tray of a run approaches successive feed units and such petcocks may, likewise, be successively turned off as the last of a run of trays passes each feed unit.

In the event it is desired to interrupt all feeding operations simultaneously while the conveyor continues to run, as is sometimes the case when hand feeding rather than automatic is desired, the handle 56 can be moved at any time during the cycle from the position shown in FIGS. 1 and 6 to the position shown in FIG. 5 whereupon as soon as the actuating rod 39 is in its down position shown in FIG. 2 the latch 49 will engage to interrupt further actuation of the transfer arm while the conveyor continues its movement. At any time resumption of feed is desired the handle 56 can be returned to its normal position as shown in FIG. 1 at any time during the cycle which will immediately move the latch arm 51 from the position shown in FIG. 5 to that of FIG. 6, the latch 49 remaining in engagement until the high point of the cam lobe of cam 44 absorbs the tension of spring 47 and lowers rod 39 permitting latch 49 also to move to the position shown in FIG. 6 through the action of spring 57 whereupon the feeding operation is resumed and the automatic feed properly re-synchronized in relationship with conveyor movement.

While a preferred embodiment of the present improved construction has been shown and described above in detail it will be understood that numerous modifications might be resorted to without departing from the scope of the invention as defined in the following claims.

I claim:

1. Transfer apparatus characterized by a fixed frame, an actuating arm pivotally mounted on said frame for reciprocating travel through a limited arc, a transfer member pivotally mounted on said actuating arm, a transfer engagement surface on said transfer member variable through combined pivotal movements of said actuating arm and transfer member, a control element on said transfer member and a reaction means engageable by said control element establishing the angular position of said transfer member and engagement surface relative to the angular position of said actuating arm, said engagement surface being movable to angularly disposed pickup and discharge positions at respective extremities of said actuating arm's travel.

2. Transfer apparatus as set forth in claim 1 wherein said reaction means has a fixed position spaced from the pivot of said actuating arm on said frame a distance greater than the spacing of said pivot from said transfer member's pivotal mounting.

3. Transfer apparatus as set forth in claim 1 wherein the relative locations of respective pivotal connections, reaction means and engagement surface are adapted to provide substantially normal movement of said engagement surface at the extremities of its travel relative to said pickup and discharge positions.

4. Transfer apparatus as set forth in claim 1 including rotary cam drive means for moving said actuating arm.

5. Transfer apparatus as set forth in claim 4 including linear conveyor means passing said discharge position, and synchronized drive means for said conveyor and said rotary cam means.

6. Transfer apparatus as set forth in claim 1 including linear conveyor means passing said discharge position, synchronized drive means for said conveyor and transfer member, and latch means adapted to arrest the travel of said transfer member while said conveyor drive continues.

7. Transfer apparatus as set forth in claim 6 including secondary latch means having two positions, resilient means responsive to one of said positions for biasing said first latch means toward an engaging position which becomes operative when said transfer member approaches said pickup position.

8. Transfer apparatus as set forth in claim 7 including resilient means responsive to the second position of said secondary latch means biasing said first latch means toward a release position rendered operative upon the re-approach of said transfer member to said pickup position.

9. Transfer apparatus as set forth in claim 1 including rotary cam drive means for moving said actuating arm, resiliently actuated cam follower means biased to normally follow said rotary cam throughout its cycle of operation, latch means adapted to hold said cam follower means near its high cam point position during the travel of said rotary cam means throughout all other positions, the resilient means for said cam follower preventing release of said latch means until the high point of said rotary cam means corresponding to the pickup position of said transfer member engages said cam follower means.

10. Transfer apparatus as set forth in claim 9 including secondary latch means having two positions, resilient means associated with said secondary latch means biasing said first mentioned latch means toward engaging or disengaging position in accordance with its two positions, and means blocking engagement of said first latch means when biased toward engaging position until the approach of said rotary cam means to its high point position.

11. Transfer apparatus as set forth in claim 6 wherein said transfer member includes a plurality of engagement surfaces linearly spaced relative to the path of conveyor travel, said engagement surfaces being simultaneously moved to a corresponding plurality of angularly disposed pickup and discharge positions linearly spaced relative to said conveyor travel, said synchronized conveyor and rotary cam drive means being adapted to cycle said transfer member once during each unit movement of said conveyor equal to the spacing between adjacent engagement surfaces.

12. Transfer apparatus as set forth in claim 11 including vacuum operated means provided at said engagement surfaces for effecting pickup and discharge by said transfer member, vacuum control valve means for establishing vacuum at said pickup position and releasing vacuum at said discharge position, and valve actuating cam means driven in synchronized relation with said conveyor and transfer member.

References Cited by the Examiner
UNITED STATES PATENTS

| | | | |
|---|---|---|---|
| 740,423 | 10/03 | Griffin | 74—166 |
| 2,576,366 | 11/51 | Smith | 198—29 |
| 2,948,337 | 8/60 | Woller. | |

SAMUEL F. COLEMAN, *Primary Examiner.*

WILLIAM B. LA BORDE, *Examiner.*